US012799248B2

United States Patent

(12) United States Patent
Tranchida et al.

(10) Patent No.: US 12,799,248 B2
(45) Date of Patent: Nov. 17, 2026

(54) ETHYLENE COPOLYMERS WITH IMPROVED HOMOGENOUS MOLECULAR STRUCTURES

(71) Applicant: Borealis AG, Vienna (AT)

(72) Inventors: Davide Domenico Tranchida, Linz (AT); Joy Jie Cheng, Linz (AT); Andreas Albrecht, Linz (AT); Elena Pomakhina, Linz (AT)

(73) Assignee: BOREALIS GMBH, Vienna (AT)

(*) Notice: Subject to any disclaimer, the term of this patent is extended or adjusted under 35 U.S.C. 154(b) by 564 days.

(21) Appl. No.: 18/285,425

(22) PCT Filed: Apr. 11, 2022

(86) PCT No.: PCT/EP2022/059589

§ 371 (c)(1),
(2) Date: Oct. 3, 2023

(87) PCT Pub. No.: WO2022/218903

PCT Pub. Date: Oct. 20, 2022

(65) Prior Publication Data

US 2024/0199776 A1 Jun. 20, 2024

(30) Foreign Application Priority Data

Apr. 16, 2021 (EP) .................................... 21168791

(51) Int. Cl.
*C08F 210/16* (2006.01)
*C08J 5/18* (2006.01)

(52) U.S. Cl.
CPC ............... *C08F 210/16* (2013.01); *C08J 5/18* (2013.01); *C08J 2323/08* (2013.01)

(58) Field of Classification Search
None
See application file for complete search history.

(56) References Cited

U.S. PATENT DOCUMENTS 3,645,992 A 2/1972 Elston
2022/0049377 A1* 2/2022 Chen ..................... C08F 210/16

FOREIGN PATENT DOCUMENTS

| | | | |
|---|---|---|---|
| CN | 111902438 | A | 11/2020 |
| EP | 3760651 | A1 | 1/2021 |
| JP | 2008538376 | A5 | 10/2008 |
| KR | 20090095403 | A | 9/2009 |
| RU | 2409595 | C2 | 1/2011 |
| RU | 2519776 | C2 | 6/2014 |

(Continued)

OTHER PUBLICATIONS

Russian Search Report for Application No. 21168791.8 Dated May 14, 2024.

(Continued)

*Primary Examiner* — Richard A. Huhn
(74) *Attorney, Agent, or Firm* — Lippes Mathias LLP

(57) ABSTRACT

The present invention relates to a copolymer of ethylene and an C3 to C10 alpha-olefin, wherein the copolymer has a density of 850 to 920 kg/m3 measured according to ISO 1183, characterized by a Full Width at Half maximum (FWHM) of the crystallization peak measured according to ISO 11357-3 following the equation (I): FWHM (° C.)<−0.002104167·$d^2$+3.749833·d−1666.36 (I), wherein d is the density of the copolymer in kg/m3.

14 Claims, 3 Drawing Sheets

(56) References Cited

FOREIGN PATENT DOCUMENTS

Figure 1:
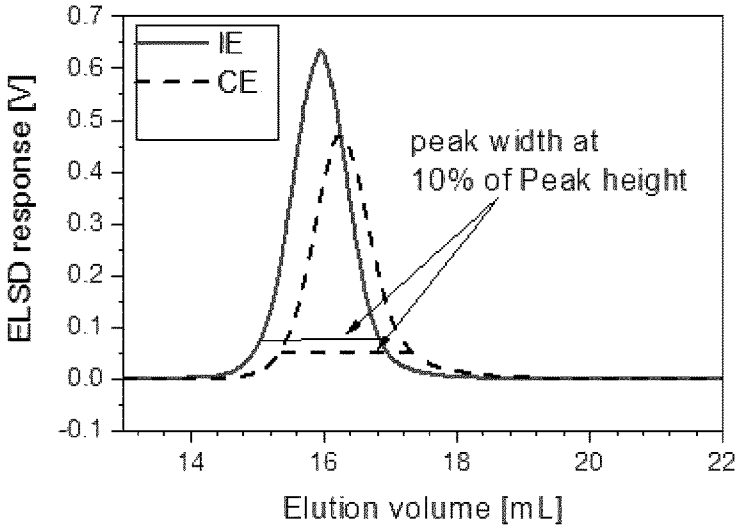

| | | | |
|---|---|---|---|
| RU | 2535201 | C2 | 10/2014 |
| WO | 2006102155 | A2 | 9/2006 |

OTHER PUBLICATIONS

Razavi-Nouri, et al. "Studies of comoner distributions and molecular segregations in metallocene-prepared polyethylenes by DSC" Polymer Testing, vol. 25, No. 8, Dec. 1, 2006 pp. 1052-1058.
International Search Report of Application No. PCT/EP2022/059589 Dated Jul. 26, 2022.
Office Action for China Patent Application No. 202280027693.6, dated Jul. 18, 2026, (9pgs).

* cited by examiner

ETHYLENE COPOLYMERS WITH IMPROVED HOMOGENOUS MOLECULAR STRUCTURES

CROSS REFERENCE TO RELATED APPLICATIONS

This is a 371 of PCT Application No. PCT/EP2022/059589, filed Apr. 11, 2022, which claims the benefit of European Application No. 21168791.8, filed Apr. 16, 2021, the contents of which are incorporated herein in their entirety.

The present invention relates to a copolymer of ethylene and an C3 to C10 alpha-olefin, wherein the copolymer is characterized by a specific Full Width at Half maximum (FWHM) of the crystallization peak, an article comprising the copolymer of ethylene and an C3 to C10 alpha-olefin and the use of the copolymer of ethylene and an C3 to C10 alpha-olefin.

Among polyolefin plastomers and polyolefin elastomers ethylene alpha-olefin copolymers (EOC) are widely used. Ethylene alpha-olefin plastomers are used in a variety of applications, such as sealing, flexible and rigid packaging. Ethylene alpha-olefin copolymers are in particular used as blending partner for impact modification of polypropylene homo- and copolymers. Ethylene alpha-olefin elastomers are used for applications such as interior and exterior car parts, adhesives, cable compounds.

Ethylene copolymers are also used for making films. For the quality of films, it is inter alia important that the film has the desired optical properties such as the desired haze and gloss.

Desired in the art are also ethylene copolymers having homogeneous molecular structures. In other words, uniform ethylene copolymers having a reduced chemical heterogeneity are sought for. The homogeneity or uniformity of molecular structures of ethylene copolymers can be measured and expressed in several ways.

The crystallinity distribution can be used to characterize the homogeneity of the ethylene copolymers. The crystallinity distribution can be expressed by the full width at half maximum (FWHM) of the crystallization peak measured by differential scanning calorimetry (DSC). The smaller the FWHM the narrower is the crystallinity distribution.

Another characterization of the chemical homogeneity is the Chemical composition distribution (CCD) which is a fundamental metric for representing molecular structures of copolymers in addition to molecular weight distribution (MWD). The narrower the CCD, the more homogeneous is the ethylene copolymer.

A further characterization which takes the molecular weight distribution (MWD) of the ethylene copolymers into account is the Molecular Weight Adjusted Chemical Heterogeneity Index (MoCHI). The higher the MoCHI, the more chemically homogeneous is the ethylene copolymer.

There is a need in the art for ethylene alpha-olefin copolymers having a low chemical heterogeneity.

It is thus an object of the present invention to provide ethylene alpha-olefin copolymers having improved homogeneous molecular structures.

It is a further object of the invention to provide ethylene alpha-olefin copolymers suitable for producing films having improved optical properties, in particular improved haze and/or gloss.

In the present invention it has been surprisingly found that the ethylene copolymers according to the invention show an improved chemical homogeneity expressed by a narrow FWHM of the crystallisation peak, a narrow chemical composition distribution and an improved Molecular Weight Adjusted Chemical Heterogeneity Index compared to state of the art ethylene copolymers.

The invention thus provides a copolymer of ethylene and an C3 to C10 alpha-olefin, wherein the copolymer has a density of 850 to 920 kg/m3 measured according to ISO 1183, characterized by a Full Width at Half maximum (FWHM) of the crystallization peak measured according to ISO 11357-3 following the equation (I):

$$\text{FWHM } (°\text{ C.}) < -0.002104167 \cdot d^2 + 3.749833 \cdot d - 1666.36 \quad \text{(I)}$$

wherein d is the density of the copolymer in kg/m$^3$.

Preferably, the Full Width at Half maximum (FWHM) of the crystallization peak measured according to ISO 11357-3 follows the equation (Ia):

$$\text{FWHM } (°\text{ C.}) < -0.00272998 \cdot d^2 + 4.856042 \cdot d - 2155.28 \quad \text{(Ia)}$$

The measurement of the Full Width at Half maximum (FWHM) is described below in the example section.

The ethylene copolymer according to the invention have surprising advantages. The main advantage is their low chemical heterogeneity expressed by a narrow FWHM of the crystallisation peak, a narrow chemical composition distribution and an improved Molecular Weight Adjusted Chemical Heterogeneity Index. A further advantage is that films made from these ethylene copolymers show an improved haze and/or improved gloss. Hence, the inventive ethylene copolymers do not only have an improved chemical homogeneity, but at the same time provide improved optical properties to films made from the copolymers.

Preferably, the copolymer has a MFR2 of 0.1 to 45 g/10 min, more preferably 0.2 to 40 g/10 min, more preferably 0.4 to 36 g/10 min, and most preferably 0.7 to 32 g/10 min, measured according to ISO 1133.

Preferably, the alpha-olefin is present in the copolymer in an amount of 10 to 47 wt. %, more preferably 11 to 45 wt. %, more preferably 11.5 to 43 wt. %, and most preferably 12 to 41 wt. %, based on the total weight of the copolymer.

The ethylene copolymers according to the inventing are preferably characterized by a narrow chemical composition distribution (CCD). Preferably, the copolymer has a chemical composition distribution (CCD) characterized by a Peak width at 10% of Peak maximum (PWPM) following the equation (II):

$$\text{PWPM} < 0.22 \cdot \ln(\text{MFR}_2) + 19.83 - 0.02 \cdot d \quad \text{(II)}$$

wherein d is the density of the copolymer in kg/m$^3$.

The measurement of the Peak width at 10% of Peak maximum (PWPM) is described below in the example section.

Preferably, the copolymer has a density of 855 to 910 kg/m3 measured according to ISO 1183.

The ethylene copolymers according to the invention are preferably characterized by an improved Molecular weight Adjusted Chemical Heterogeneity Index. Preferably, the copolymer has a Molecular weight Adjusted Chemical Heterogeneity Index (MoCHI) of 11.5 to 18, more preferably of 12.0 to 17.8, and most preferably of 13.0 to 17.6.

The Molecular weight Adjusted Chemical Heterogeneity Index (MoCHI) is calculated according to equation (III):

$$\text{MoCHI} = 0.01 \cdot \text{Area } A \cdot \text{delta Tp}(0.75) \cdot \log(\text{Mw}) \quad \text{(III)}$$

The measurement of the Molecular weight Adjusted Chemical Heterogeneity Index (MoCHI) is described in more detail in the example section below.

Preferably, the copolymer of the invention has an Area A of from 32 to 60, more preferably from 35 to 55, and most preferably from 40 to 50, and/or a delta Tp(0.75) of from 5.0 to 8.1, more preferably of from 5.1 to 8.0 and most preferably of from 5.4 to 7.8.

Preferably, the copolymer having the Molecular weight Adjusted Chemical Heterogeneity Index (MoCHI) as described above has a density of 890 to 920 kg/$m^3$, more preferably 895 to 910 kg/$m^3$, measured according to ISO 1183.

The copolymer of the invention is a copolymer of ethylene and an C3 to C10 alpha-olefin. The alpha-olefin can be a C3 alpha-olefin, i.e. propene, a C4 alpha-olefin, i.e. 1-butene, a C5 alpha-olefin, i.e. 1-pentene, a C6 alpha-olefin, i.e. 1-hexene, a C7 alpha-olefin, i.e. 1-heptene, a C8 alpha-olefin, i.e. 1-octene, a C9 alpha-olefin, i.e. 1-nonene or a C10 alpha-olefin, i.e. 1-dodecene. Preferably, the C3 to C10 alpha-olefin is a linear C3 to C10 alpha-olefin. Preferably, the alpha-olefin is 1-butene or 1-octene, more preferably 1-octene.

Preferably, the copolymer has a MFR21 of 20 to 950 g/10 min, more preferably 22 to 900 g/10 min, more preferably 24 to 850 g/10 min, and most preferably 26 to 800 g/10 min, measured according to ISO 1133.

Preferably, the copolymer has a ratio MFR21/MFR2 of 15 to 42, more preferably 18 to 40, more preferably 20 to 38, and most preferably 22 to 36.

Preferably, the copolymer has an Mw/Mn (determined by Gel Permeation Chromatography (GPC) according to ASTM D 6474-12) of 2.1 to 3.1, more preferably 2.2 to 3.0, more preferably 2.3 to 2.9, and most preferably 2.4 to 2.8.

Preferably, the copolymer has an Mw (determined by Gel Permeation Chromatography (GPC) according to ASTM D 6474-12) of 30000 to 110000 g/mol, more preferably 33000 to 105000 g/mol, and most preferably 36000 to 100000 g/mol.

The present invention further provides an article comprising the copolymer according to the invention. All preferred embodiments of the copolymer of the invention as describe above are also preferred embodiment of the article according to the invention, if applicable.

Preferably, the article is a film.

The present invention further provides the use of the copolymer according to the invention for improving the gloss and/or the haze of a film comprising the copolymer. All preferred embodiments of the copolymer of the invention as described above are also preferred embodiment of the use according to the invention, if applicable.

The invention further provides a copolymer of ethylene and an C3 to C10 alpha-olefin, wherein the copolymer has a density of 850 to 920 kg/$m^3$ measured according to ISO 1183, characterized by a Molecular weight Adjusted Chemical Heterogeneity Index (MoCHI) of 11.5 to 18. Preferably, the copolymer as a density of 890 to 920 kg/$m^3$, more preferably 895 to 910 kg/$m^3$, measured according to ISO 1183. All preferred embodiments of the copolymer according to the invention as described herein are also preferred embodiments of the copolymer of ethylene and an C3 to C10 alpha-olefin characterized by the Molecular weight Adjusted Chemical Heterogeneity Index (MoCHI) of 11.5 to 18, if applicable.

The invention further provides a copolymer of ethylene and an C3 to C10 alpha-olefin, wherein the copolymer has a density of 850 to 920 kg/$m^3$ measured according to ISO 1183, wherein the copolymer has a chemical composition distribution (CCD) characterized by a Peak width at 10% of Peak maximum (PWPM) following the equation (II):

$$PWPM<0.22\cdot\ln(MFR2)+19.83-0.02\cdot d \quad (II)$$

wherein d is the density of the copolymer in kg/$m^3$.

All preferred embodiments of the copolymer according to the invention as described herein are also preferred embodiments of the copolymer of ethylene and an C3 to C10 alpha-olefin characterized by the width at 10% of Peak maximum (PWPM) following the equation (II): $PWPM<0.22\cdot\ln(MFR_2)+19.83-0.02\cdot d$ (II), wherein d is the density of the copolymer in kg/$m^3$, if applicable.

Preparation Methods

The copolymers according to the invention can be preferably produced in a high temperature solution polymerization process at temperatures higher than 100° C. Such a process is essentially based on polymerizing the monomer, i.e. ethylene, and a suitable comonomer, i.e. a C3 to C10 alpha-olefin, preferably 1-octene, in a hydrocarbon solvent, being liquid under the polymerization conditions and in which the resulting polymer is soluble. The polymerization is carried out at a temperature above the melting point of the polymer, as a result of which a polymer solution is obtained. This solution is preferably flashed in multiple steps in order to separate the polymer from the unreacted monomer and the solvent. The solvent is then recovered and recycled in the process.

A solution polymerization process is known for its short reactor residence times (compared to Gas-phase or slurry processes) allowing, thus, very fast grade transitions and significant flexibility in producing a wide product range in a short production cycle.

The used solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in the reactor depends on the temperature, on one hand, and the type and the amount of the comonomer, on the other hand. The pressure is suitably from 50 to 300 bar, preferably from 60 to 250 bar and more preferably from 70 to 200 bar.

The process includes one or more polymerization reactors. Suitable reactors include unstirred or stirred, spherical, cylindrical and tank-like vessels and recirculating loop reactors and tubular reactors. Such reactors typically include feeding points for monomer, optional comonomer, solvent, catalyst and optional other reactants and additives and withdrawal points for polymer solutions. In addition, the reactors may include heating or cooling means.

The hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably, unsubstituted $C_{6-10}$-hydrocarbon solvents are used.

In addition, other components may be added into the reactor. It is known to feed hydrogen into the reactor for controlling the molecular weight of the polymer formed during the polymerization. The use of different antifouling compounds is also already known in the art. In addition, different kinds of activity boosters or activity retarders may be used for controlling the activity of the catalyst.

A preferred process for the preparation of the copolymer according to the invention is a high temperature solution process as described above, preferably at a temperature greater than 100° C., in the presence of a metallocene catalyst system, the metallocene catalyst system comprising, or consisting of, (i) at least one metallocene complex, (ii) an aluminoxane cocatalyst and/or an boron containing cocatalyst, and (iii) optionally an aluminium alkyl compound $Al(R^6)_3$, with $R^6$ being a linear or branched $C_2$-$C_8$-alkyl group.

Preferably, the at least one metallocene complex (i) comprises, or consists of, a metallocene complex of formula (IV)

(IV)

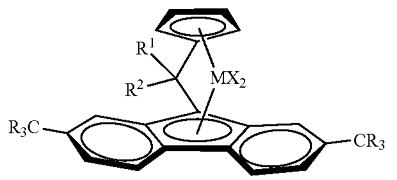

wherein M is Hf,

X is a sigma ligand,

R are the same or different from each other and can be saturated linear or branched $C_1$-$C_{10}$ alkyl, $C_6$-$C_{10}$ aryl, $C_4$-$C_{10}$ heteroaryl, $C_6$-$C_{20}$ alkylaryl or $C_6$-$C_{20}$ arylalkyl groups, which can optionally contain up to 2 heteroatoms or silicon atoms, $R^1$ is a $C_6$-$C_{10}$ aryl or $C_6$-$C_{20}$ alkylaryl group optionally containing up to 2 heteroatoms or silicon atoms or a $C_4$-$C_{10}$ heteroaryl group, $R^2$ is a $C_4$-$C_{20}$ cycloalkyl group, optionally carrying alkyl substituents in beta-positions, of formula (V)

(V)

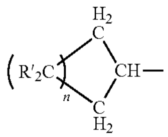

in which R' can be the same or can be different from each other and can be hydrogen or is defined as R and n is 1 to 17, and/or the metallocene complex (i) comprises, or consists of, a metallocene complex of formula (VI)

(VI)

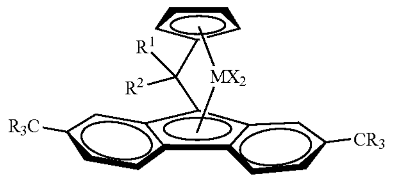

wherein M is Hf,

X is a sigma ligand,

R are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms or silicon atoms, $R^1$ is a $C_6$-$C_{20}$-aryl, which can be unsubstituted or substituted by one or up to 5 linear or branched $C_1$-$C_{10}$ alkyl group(s), $R^2$ is an unsaturated linear or cyclic $C_3$-$C_{20}$ alkyl group or a branched $CR^3R^4R^5$ group, wherein $R^3$ is hydrogen or a $C_1$-$C_{20}$ alkyl group and $R^4$ and $R^5$ are the same or are different and can be a $C_1$-$C_{20}$ alkyl group.

Preferably, the at least one metallocene complex of formula (IV) is a metallocene complex of formula (IVa)

(IVa)

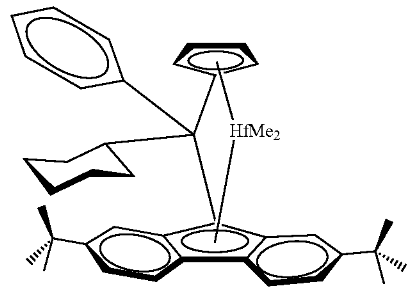

((Phenyl)(cyclohexyl)methylene(cyclopentadienyl)(2,7-di-tert-butylfluoren-9-yl)hafnium dimethyl)

Preferably, the at least one metallocene complex of formula (VI) is a metallocene complex of formula (VIa)

(VIa)

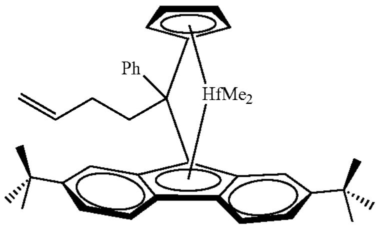

((Phenyl)(3-buten-1-yl)methylene(cyclopentadienyl)(2,7-di-tert-butylfluoren-9-yl) hafnium dimethyl)

Most preferably (Phenyl)(cyclohexyl)methylene(cyclopentadienyl)(2,7-di-tert-butylfluoren-9-yl)hafnium dimethyl) is used as metallocene complex (i).

The above mentioned metallocene complexes of formulae (IV) and (VI) and their preparation are described in more detail in WO2018108917 and WO2018108918.

As cocatalyst (ii) either an aluminoxane or a boron containing cocatalyst or mixtures therefrom can be used.

The aluminoxane cocatalyst can be one of formula (VII)

(VII)

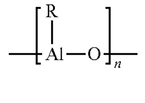

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_6$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (VII).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

The molar ratio of Al in the aluminoxane to the transition metal of the metallocene may be in the range of 1:1 to 2000:1 mol/mol, preferably 10:1 to 1000:1, more preferably 50:1 to 500:1 mol/mol.

Suitable amounts of cocatalyst will be well known to the skilled man.

In an embodiment of the present invention aluminoxane (ii), preferably methylaluminoxane, and an aluminium alkyl compound of the formula $Al(R^6)_3$ with $R^6$ being a linear or branched $C_2$-$C_8$-alkyl group (iii) are used as cocatalyst.

In this case the cocatalyst is preferably a reaction product of (ii) the aluminoxane, preferably methylaluminoxane with (iii) the aluminium alkyl compound, such as tri-iso-butyl aluminum, tri-iso-hexyl aluminium, tri-n-octyl aluminum, tri-iso-octyl aluminium and the like. The ratio between methylalumoxane and the aluminium alkyl compound can be between 10:1 and 1:10, preferably 5:1 to 1:5, most preferably 3:1 to 1:3 moles of Al in the methylalumoxane to moles of aluminium of the aluminium alkyl compound. The reaction between methylaluminoxane and the aluminium alkyl compound is carried out by mixing the two components in a suitable solvent, which can be aromatic or aliphatic, at a temperature between −50° to +80° C., preferably between 10° and 50° C., more preferably between 20° and 40° C.

Boron based cocatalysts of interest include boron compounds containing a borate $3^+$ ion, i.e. borate compounds. These compounds generally contain an anion of formula:

$$(Z)_4B^- \qquad \text{(VIII)}$$

where Z is an optionally substituted phenyl derivative, said substituent being a halo$C_{1-6}$-alkyl or halo group. Preferred options are fluoro or trifluoromethyl. Most preferably, the phenyl group is perfluorinated.

Such ionic cocatalysts preferably contain a non-coordinating anion such as tetrakis(pentafluorophenyl)borate.

Suitable counterions are protonated amine or aniline derivatives or phosphonium ions. These may have the general formula (IX) or (X):

$$NQ_4^+ \qquad \text{(IX) or}$$

$$PQ_4^+ \qquad \text{(X)}$$

where Q is independently H, $C_{1-6}$-alkyl, $C_{3-8}$ cycloalkyl, phenyl$_{C1-6}$-alkylene- or optionally substituted Ph. Optional substituents may be $C_{1-6}$-alkyl, halo or nitro. There may be one or more than one such substituent. Preferred substituted Ph groups include therefore para-substituted phenyl, preferably tolyl or dimethylphenyl.

It is preferred if at least one Q group is H, thus preferred compounds are those of formula:

$$NHQ_3^+ \qquad \text{(XI) or}$$

$$PHQ_3^+ \qquad \text{(XII)}$$

Preferred phenyl-$C_{1-6}$-alkyl-groups include benzyl.

Suitable counterions therefore include: methylammonium, anilinium, dimethylammonium, diethylammonium, N-methylanilinium, diphenylammonium, N, N-dimethylanilinium, trimethylammonium, triethylammonium, tri-n-butylammonium, methyldiphenylammonium, p-bromo-N, N-dimethylanilinium or p-nitro-N, N-dimethylanilinium, especially dimethylammonium or N, N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium.

A more preferred counterion is trityl ($CPh_3^+$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include:

tributylammoniumtetra(pentafluorophenyl)borate,
tributylammoniumtetra(trifluoromethylphenyl)borate,
tributylammoniumtetra-(4-fluorophenyl)borate,
N,N-dimethylcyclohexylammoniumtetrakis-(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakis(pentafluorophenyl)borate,
triphenylcarbeniumtetrakis(pentafluorophenyl)borate,
ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate,
N,N-dimethylbenzylammoniumtetrakis(pentafluorophenyl)borate or
N,N-dimethylaniliniumtetrakis(pentafluorophenyl)borate.

More preferred borates are triphenylcarbeniumtetrakis(pentafluorophenyl) borate and N, N-dimethylaniliniumtetrakis(pentafluorophenyl)borate.

N,N-dimethylaniliniumtetrakis(pentafluorophenyl)borate is most preferred.

It is further possible to add an aluminium alkyl compound. Suitable aluminium alkyl compounds are compounds of the formula (VIII) $AlR_3$ with R being a linear or branched $C_2$-$C_8$-alkyl group.

Preferred aluminium alkyl compounds are triethylaluminium, tri-isobutylaluminium, tri-isohexylaluminium, tri-n-octylaluminium and tri-isooctylaluminium.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

Even more preferred is a molar ratio of boron to the metal ion of the metallocene from 1:1 to less than 2:1 mol/mol, e.g. from 1:1 to 1.8:1 or 1:1 to 1.5:1.

According to the present invention preferably a boron containing cocatalyst, as described above, is used.

Figure 2:
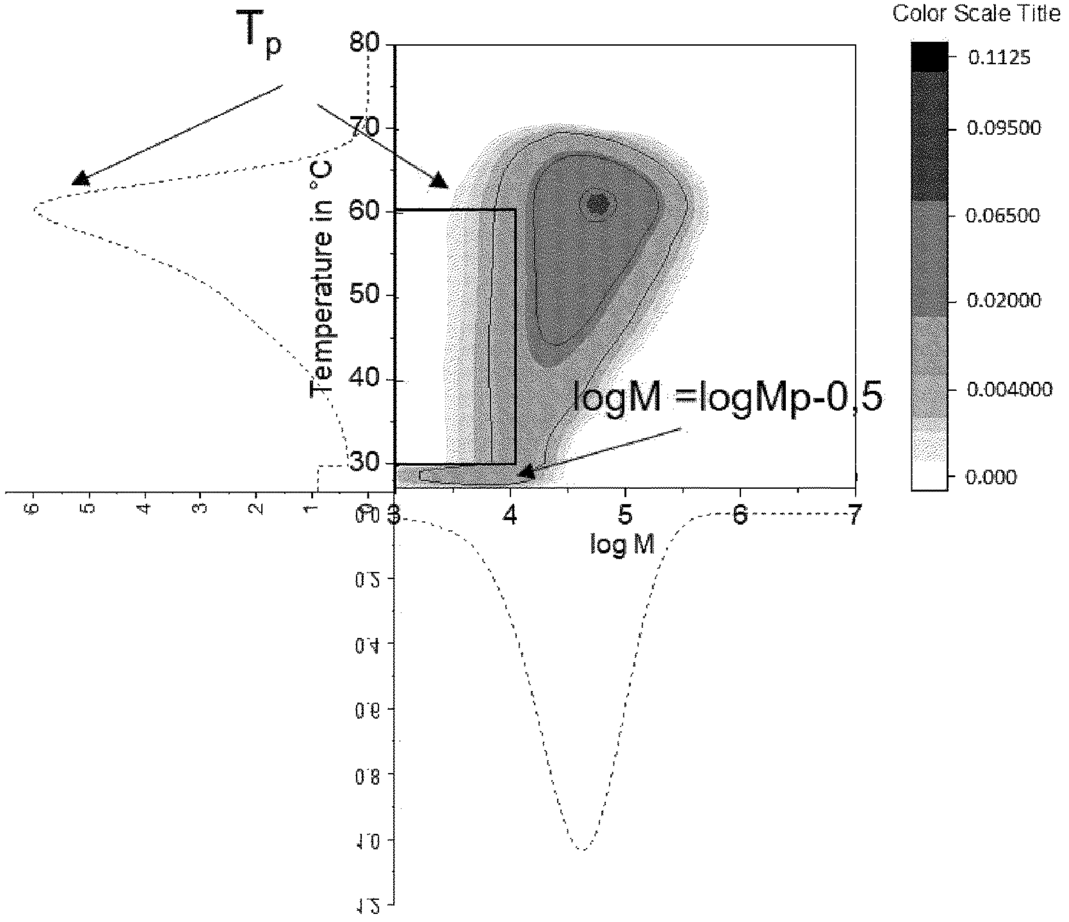
Figure 3:
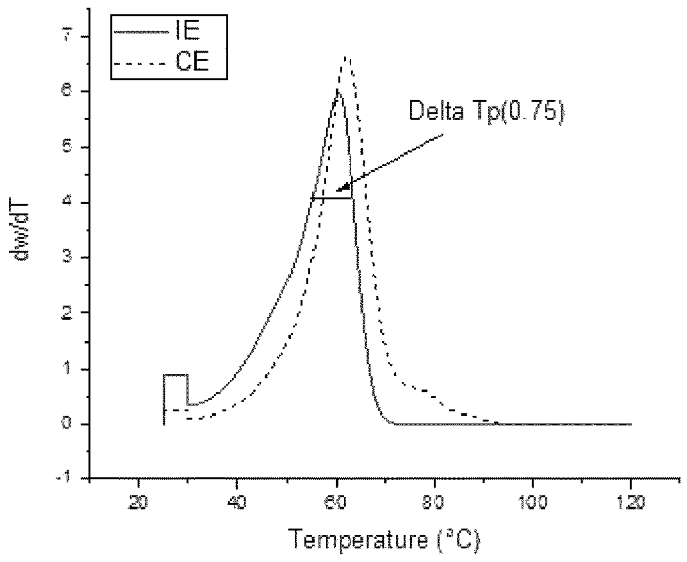

The invention will be illustrated in more detail by the following non-limiting examples and figures below. The figures show FIG. 1 elution diagram and determination of the PWPM, FIG. 2 cross-fractionation chromatograph (CFC) of inventive example IE2, FIG. 3 a-TREF profile from CFC of FIG. 2 and calculated deltaTp(0.75), FIG. 4 Haze of films made from inventive and comparative examples, and FIG. 5 Gloss 20° of films made from inventive and comparative examples.

EXAMPLE SECTION

1. Measurement Methods a) Melt Flow Rate (MFR) and Flow Rate Ratio (FRR)

The melt flow rate (MFR) was determined according to ISO1133—Determination of the melt mass-flow rate (MFR) and melt volume-flow rate (MVR) of thermoplastics—Part 1: Standard method, and is indicated in g/10 min. The MFR is an indication of flowability, and hence processability, of the polymer. The higher the melt flow rate, the lower the viscosity of the polymer.

The MFR2 of polyethylene was determined at a temperature of 190° C. and a load of 2.16 kg, the MFR21 of polyethylene was determined at a temperature of 190° C. and a load of 21.6 kg.

The flow rate ratio (FRR) is the MFR21/MFR2.

b) Density

The density of the copolymer was measured according to ISO1183-1:2004 (method A) on compression moulded specimen prepared according to EN ISO 1872-2 (February 2007) and is given in $kg/m^3$.

c) Comonomer Content

Quantitative nuclear-magnetic resonance (NMR) spectroscopy was used to quantify the comonomer content of the copolymers.

Quantitative $^{13}C\{^1H\}$ NMR spectra recorded in the molten-state using a Bruker Avance III 500 NMR spectrometer operating at 500.13 and 125.76 MHz for 1H and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the transient NOE at short recycle delays of 3 s and the RS-HEPT decoupling scheme. A total of 1024 (1 k) transients were acquired per spectrum.

Quantitative $^{13}C\{^1H\}$ NMR spectra were processed, integrated and quantitative properties determined using custom spectral analysis automation programs. All chemical shifts are internally referenced to the bulk methylene signal ($\delta^+$) at 30.00 ppm.

Characteristic signals corresponding to the incorporation of 1-octene were observed and all comonomer contents calculated with respect to all other monomers present in the polymer.

Characteristic signals resulting from isolated 1-octene incorporation, i.e. EEOEE comonomer sequences, were observed. Isolated 1-octene incorporation was quantified using the integral of the signal at 38.3 ppm. This integral is assigned to the unresolved signals corresponding to both *B6 and $_*$bB6B6 sites of isolated (EEOEE) and isolated double non-consecutive (EEOEOEE) 1-octene sequences respectively. To compensate for the influence of the two $_*$bB6B6 sites the integral of the bbB6B6 site at 24.6 ppm is used:

$$O=I_{*B6+*bB6B}6-2*I_{bbB6B6}$$

Characteristic signals resulting from consecutive 1-octene incorporation, i.e. EEOOEE comonomer sequences, were also observed. Such consecutive 1-octene incorporation was quantified using the integral of the signal at 40.4 ppm assigned to the aaB6B6 sites accounting for the number of reporting sites per comonomer:

$$OO=2*I_{aaB6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.6 ppm assigned to the bbB6B6 sites accounting for the number of reporting sites per comonomer:

$$OEO=2*I_{bbB6B6}$$

Characteristic signals resulting from isolated triple-consecutive 1-octene incorporation, i.e. EEOOOEE comonomer sequences, were also observed.

Such isolated triple-consecutive 1-octene incorporation was quantified using the integral of the signal at 41.2 ppm assigned to the aagB6B6B6 sites accounting for the number of reporting sites per comonomer:

$$OOO=3/2*I_{aagB6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total}=O+OO+OEO+OOO$$

Characteristic signals resulting from saturated end-groups were observed. Such saturated end-groups were quantified using the average integral of the two resolved signals at 22.9 and 32.23 ppm. The 22.84 ppm integral is assigned to the unresolved signals corresponding to both 2B6 and 2S sites of 1-octene and the saturated chain end respectively. The 32.2 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S=(1/2)*(I_{2S+2B6}+I_{3S+3B6}-2*O_{total})$$

The ethylene comonomer content was quantified using the integral of the bulk methylene (bulk) signals at 30.00 ppm. This integral included the D and 4B6 sites from 1-octene as well as the DD sites. The total ethylene comonomer content was calculated based on the bulk integral and compensating for the observed 1-octene sequences and end-groups:

$$E_{total}=(1/2)*[I_{bulk}+2*O+1*OO+3*OEO+0*OOO+3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO=O_{total}/(E_{total}+O_{total})$$

The total comonomer incorporation of 1-octene in weight percent was calculated from the mole fraction in the standard manner:

$$O[\text{wt }\%]=100*(fO*112.21)/((fO*112.21)+((1-fO)*28.05))$$

Further information can be found in the following references:

Klimke, K., Parkinson, M., Piel, C., Kaminsky, W., Spiess, H. W., Wilhelm, M., Macromol. Chem. Phys. 2006; 207:382.
Parkinson, M., Klimke, K., Spiess, H. W., Wilhelm, M., Macromol. Chem. Phys. 2007; 208:2128.
NMR Spectroscopy of Polymers: Innovative Strategies for Complex Macromolecules, Chapter 24, 401 (2011)
Pollard, M., Klimke, K., Graf, R., Spiess, H. W., Wilhelm, M., Sperber, O., Piel, C., Kaminsky, W., Macromolecules 2004; 37:813.
Filip, X., Tripon, C., Filip, C., J. Mag. Resn. 2005, 176, 239
Griffin, J. M., Tripon, C., Samoson, A., Filip, C., and Brown, S. P., Mag. Res. in Chem. 2007 45, S1, S198
Castignolles, P., Graf, R., Parkinson, M., Wilhelm, M., Gaborieau, M., Polymer 50 (2009) 2373
Zhou, Z., Kuemmerle, R., Qiu, X., Redwine, D., Cong, R., Taha, A., Baugh,
D. Winniford, B., J. Mag. Reson. 187 (2007) 225
Busico, V., Carbonniere, P., Cipullo, R., Pellecchia, R., Severn, J., Talarico, G., Macromol. Rapid Commun. 2007, 28, 1128
J. Randall, Macromol. Sci., Rev. Macromol. Chem. Phys. 1989, C29, 201.
Qiu, X., Redwine, D., Gobbi, G., Nuamthanom, A., Rinaldi, P., Macromolecules 2007, 40, 6879
Liu, W., Rinaldi, P., McIntosh, L., Quirk, P., Macromolecules 2001, 34, 4757 d) Determination of the Molecular Weight Averages, Molecular Weight Distribution Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with a multiple band infrared detector model IR5 (PolymerChar, Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. at a constant flow rate of 1 mL/min. 200 μL of sample solution was injected per analysis. Data collection was performed by using PolymerChar GPC-one software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3}\text{ mL/g},\ \alpha_{PS}=0.655$$

$$K_{PE}=39\times10^{-3}\text{ mL/g},\ \alpha_{PE}=0.725$$

A third order polynomial fit was used to fit the calibration data.

All samples were prepared in the concentration range of 0.5 to 1 mg/ml and dissolved at 160°C. for 3 hours under continuous gentle shaking.

e) Full Width at Half Maximum (FWHM) of the Crystallisation Peak

Differential Scanning calorimetry (DSC) experiments were run on a TA Instruments Q200 device calibrated with Indium, Zinc, and Tin according to ISO 11357/1. The measurements were run under nitrogen atmosphere (50 mL $min^{-1}$) on 5±1 mg samples in a heat/cool/heat cycle with a scan rate of 10° C./min between −50° C. and 180° ° C. according to ISO 11357-3 for the first and second heating runs and the cooling run. The latter was integrated between −20° C. and the end of the crystallization peak. The FWHM was calculated on the cooling thermogram after baseline subtraction, as the temperature range between the two temperatures at which the peak reached at least half of the maximum value of the heat flow.

f) Chemical Composition Distribution (CCD)

Thermal gradient interaction chromatography (TGIC) was used to determine the Chemical composition distribution (CCD).

Interaction chromatography experiments were performed using a solvent gradient interaction chromatograph (SGIC) constructed by Polymer Char (Valencia, Spain). A Hypercarb column (Hypercarb®, Thermo Scientific, Dreieich, Germany) with 100×4.6 mm internal diameter packed with porous graphite particles having a particle diameter of 5 μm (making a surface area of 120 $m^2g^{-1}$) and pore size of 250 Å was used for all HT-TGIC experiments. A modified gas chromatograph oven was used to house the column and the injection loops and valves at 160° C. An evaporative light scattering detector (ELSD, model PL-ELS 1000, Polymer Laboratories, Church Stretton, England) was used for all detection purposes with the following parameters: gas flow rate of 1.5 L/min, 160° C. nebuliser temperature and an evaporative temperature of 270° C. The flow rate of the mobile phase during analysis was 0.5 $mLmin^{-1}$.

A concentration of 1-1.2 $mgmL^{-1}$ was used (approximately 4-5 mg in 4 mL) with 50 μL of each sample being injected.

Thermal gradient interaction chromatography (TGIC) separations were achieved by using ortho-Dichlorobenzene (ODCB) as mobile phase and solvent.

After loading the sample on the hypercarb column, the flow was stopped and the oven with the hypercarb column was stabilized for 15 minutes at 160° C. After the column compartment was cooled down to 40° C. in 10 minutes and stabilised for 5 minutes at 40° C. During the elution process, a flow rate of 0.5 ml/min was applied. In the first 10 minutes of elution the temperature was kept at 40° C. and afterwards increased in a continuous way to 170° C. using a heating rate of 1.7° C./min.

From the obtained elution profile, the peak width at 10% of the peak maximum was determined in the unit mL. The determination is illustrated in FIG. 1 below for IE6 and CE7 (Lucene LC100).

g) Molecular Weight Adjusted Chemical Heterogeneity Index (MoCHI)

The Molecular Weight Adjusted Chemical Heterogeneity Index (MoCHI) was obtained by using cross-fractionation chromatograph (CFC). CFC uses both temperature rising elution fractionation device (TREF) to separate the copolymer into fractions having different crystallinity and subsequent size exclusion chromatograph (GPC) to analyse the fractions as to their molecular weight Mw.

The chemical composition distribution as well as the determination of the molecular weight distribution and the corresponded molecular weight averages (Mn, Mw and Mv) at a certain elution temperature (polymer crystallinity in solution) were determined by a full automated Cross Fractionation Chromatography (CFC) as described by Ortin A., Monrabal B., Sancho-Tello J., Macromol. Symp., 2007, 257, 13-28.

A CFC instrument (PolymerChar, Valencia, Spain) was used to perform the cross-fractionation chromatography (TREF×SEC). A four-band IR5 infrared detector (PolymerChar, Valencia, Spain) was used to monitor the concentration. Around 40 mg of the polymer sample was dissolved in 25 ml TCB in a stainless steel vessel for 150 min at 150° C. Once the sample was completely dissolved an aliquot of 0.5 ml was loaded into the TREF column and stabilized for a while at 110° C. The polymer was crystallized and precipitate to a temperature of 30° C. by applying a constant cooling rate of 0.1° C./min. A discontinuous elution process is performed using the following temperature steps: (30, 40, 45, 50, 53, 56, 59, 62, 64, 66, 69, 72, 76, 79, 82, 85, 89, 91, 93, 95, 97, 100, 110, and 120).

In the second dimension, the GPC analysis, 3 PL Olexis columns and 1× Olexis Guard columns from Agilent (Church Stretton, UK) were used as stationary phase. As eluent 1,2,4-trichlorobenzene (TCB, stabilized with 250 mg/L 2,6-Di tert butyl-4-methyl-phenol) at 150° C. and a constant flow rate of 1 mL/min were applied. The column set was calibrated using universal calibration (according to ISO 16014-2:2003) with at least 15 narrow MWD polystyrene (PS) standards in the range of 0.5 kg/mol to 11 500 kg/mol. Following Mark Houwink constants were used to convert PS molecular weights into the PE molecular weight equivalents.

$$K_{PS}=19\times10^{-3}\ \text{mL/g},\ \alpha_{PS}=0.655$$

$$K_{PE}=39\times10^{-3}\ \text{mL/g},\ \alpha_{PE}=0.725$$

A third order polynomial fit was used to fit the calibration data. Data processing was performed using the software provided from PolymerChar with the CFC instrument.

Reference:

Ortin A., Monrabal B., Sancho-Tello J., Macromol. Symp., 2007, 257, 13-28.

The Molecular weight Adjusted Chemical Heterogeneity Index (MoCHI) is calculated according to equation (III):

$$\text{MoCHI}=0.01\cdot\text{Area } A\cdot\text{delta Tp}(0.75)\cdot\log(\text{Mw}) \qquad \text{(III)}$$

Area A is the fraction of the copolymer eluting between the elution temperature of the peak maximum Tp of the sample and 30° C. (y-axis) and having a log M value between log M of 3 and log Mp (molecular weight at peak maximum)−0.5 of the MWD obtained by CFC analysis. The determination of Area A is exemplary illustrated for Inventive example IE2 in FIG. 2.

delta Tp(0.75) is the molecular weight adjusted broadness of the broadness of the a-TREF peak at 75% peak height. The determination of delta Tp(0.75) is exemplary illustrated for Inventive example IE2 and Comparative Example CE7 (Lucene LC100) in FIG. 3.

log(Mw) is the logarithm with base 10 of the weight average molecular weight Mw of the copolymer.

h) Gloss and Haze

Gloss and Haze were determined on blown films made from inventive and comparative samples. Blown films with a thickness of 40 μm were made on a WINDMÖLLER & HÖLSCHER (W&H) blown film line with a Varex E60.30D extruder, cylinder diameter of 60 mm, screw length to diameter ratio of 30.

Blow up ratio was 1:2.5, die temperature was max. 175° C.

Blown film die: Die diameter of 200 mm, Die gap 1.2 mm

The die has 3 heating zones and is in use with an internal and external bubble cooling unit. The throughput was 60 kg/h.

Haze was determined according to ASTM D 1003-00 on films as produced indicated above.

Gloss at 20° (film outside) was determined according to ISO 2813.

2. Materials a) Inventive Examples (IE)

1) Inventive examples IE2, IE3, IE4, IE8, IE9, IE11, IE12 and IE13 are ethylene-1-octene copolymers and were produced with Borealis proprietor Borceed™ solution polymerization technology, in the presence of metallocene catalyst (phenyl)(cyclohexyl) methylene (cyclopentadienyl) (2,7-di-tert-butylfluorenyl) hafnium dimethyl and N, N-Dimethylanilinium Tetrakis (pentafluorophenyl)borate (AB) (CAS 118612-00-3) was used, commercially available from Boulder, as cocatalyst.

The polymerization conditions for the aforementioned inventive examples were selected in such a way that the reacting system is one liquid phase (T between 150 and 200° C.; 60 to 150 bar).

2) Inventive examples IE1, IE5, IE6, IE7 and IE10 are ethylene-1-octene copolymers and were produced with Borealis proprietor Borceed™ solution polymerization technology, in the presence of metallocene catalyst Phenyl)(3-buten-1-yl)methylene(cyclopentadienyl) (2,7-di-tert-butylfluoren-9-yl) hafnium dimethyl and N,N-Dimethylanilinium Tetrakis(pentafluorophenyl) borate (AB) (CAS 118612-00-3) was used, commercially available from Boulder, as cocatalyst.

The polymerization conditions for the aforementioned inventive examples were selected in such a way that the reacting system is one liquid phase (T between 150 and 200° C.; 60 to 150 bar).

Properties of the inventive examples used herein are given in Table A below.

TABLE A

Properties of the inventive examples

| | Density, kg/m$^3$ | C8, wt. % | MFR2, g/10 min | FRR | Mw/Mn |
|---|---|---|---|---|---|
| IE1 | 901.7 | 16.96 | 31.2 | 24.6 | 2.58 |
| IE2 | 902.6 | 16 | 9.6 | 28.6 | 2.62 |
| IE3 | 901.8 | 16.3 | 10.1 | 25.7 | 2.51 |
| IE4 | 882.5 | 26.03 | 11.3 | 27.4 | 2.56 |
| IE5 | 882.9 | 25.93 | 11.3 | 26.5 | 2.54 |
| IE6 | 901.0 | 15.52 | 0.91 | 30.92 | 2.68 |
| IE7 | 899.7 | 17.96 | 10.19 | 28.27 | 2.77 |
| IE8 | 900.6 | 15.66 | 1.03 | 30.62 | 2.6 |
| IE9 | 861.2 | 37.09 | 0.87 | 35.08 | 2.66 |
| IE10 | 857.7 | 39.60 | 2.00 | 33.23 | 2.72 |
| IE11 | 900.6 | 17.00 | 9.21 | 29.12 | 2.84 |
| IE12 | 908.6 | 12.00 | 1.06 | 33.64 | 2.61 |
| IE13 | 908.2 | 12.92 | 6.25 | 26.31 | 2.63 |

b) Comparative Examples (CE)

Comparative example CE1 is an ethylene based 1-octene plastomer (octene content 17.5 wt. %) having an MFR2 of 30 g/10 min, a density of 902 kg/m$^3$, commercially available from Borealis. CE1 was produced in a solution polymerization process using a metallocene catalyst.

CE2 is an ethylene based 1-octene plastomer (octene content 16.1 wt. %) having an MFR2 of 10 g/10 min, a density of 902 kg/m$^3$, commercially available from Borealis. CE2 was produced in a solution polymerization process using a metallocene catalyst.

CE3 is an ethylene based octene-1 plastomer (octene content 26.55 wt. %) having an MFR2 of 30 g/10 min, a density of 882 kg/m$^3$, commercially available from Borealis. CE3 was produced in a solution polymerization process using a metallocene catalyst.

CE4 is an ethylene based 1-octene plastomer (octene content 24.5 wt. %) having an MFR2 of 10 g/10 min, a density of 882 kg/m$^3$, commercially available from Borealis. CE4 was produced in a solution polymerization process using a metallocene catalyst.

CE5 is an ethylene based 1-octene plastomer (octene content 31.5 wt. %) having an MFR2 of 6.6 g/10 min, a density of 870 kg/m$^3$, commercially available from Borealis. CE5 was produced in a solution polymerization process using a metallocene catalyst.

CE11 is an ethylene based 1-octene plastomer (octene content 16.2 wt. %) having an MFR2 of 1.1 g/10 min, a density of 902 kg/m$^3$, commercially available from Borealis. CE11 was produced in a solution polymerization process using a metallocene catalyst.

CE14 is an ethylene based 1-octene plastomer (octene content 12.1 wt. %) having an MFR2 of 1.1 g/10 min, a density of 910 kg/m$^3$, commercially available from Borealis. CE16 was produced in a solution polymerization process using a metallocene catalyst.

CE15 is an ethylene based 1-octene plastomer (octene content 12.1 wt. %) having an MFR2 of 6.6 g/10 min, a density of 910 kg/m$^3$, commercially available from Borealis. CE17 was produced in a solution polymerization process using a metallocene catalyst.

Comparative examples CE6 (Engage 8540), CE9 (Engage 8842), CE12 (Engage 8480) and CE13 (Elite AT6101) are commercially available from Dow.

Comparative examples CE7 (Lucene LC100) and CE8 (Lucene LC160) are ethylene-octene copolymers commercially available from LG Chemicals.

Comparative example CE10 (Tafmer H1030S) is commercially available from Mitsui Chemicals.

3. Results

FWHM measurements of the crystallization peaks of inventive examples IE1 to IE5 and comparative examples CE1 to CE5 and CE8 have been made according to the method described above. Results are provided in Table 1 below.

TABLE 1

Results of the FWHM measurements of the crystallization peaks

| Example | Density, kg/m$^3$ | MFR2, g/10 min | FWHM, ° C. |
|---|---|---|---|
| IE1 | 901.7 | 31.2 | 3.12 |
| CE1 | 902 | 30 | 4.05 |
| IE2 | 902.6 | 9.6 | 3.63 |
| IE3 | 901.8 | 10.1 | 3.19 |
| CE2 | 902 | 10 | 4.14 |
| CE3 | 882 | 30 | 4.12 |
| IE4 | 882.5 | 11.3 | 3.48 |
| IE5 | 882.9 | 11.3 | 3.47 |
| CE4 | 882 | 10 | 4.32 |
| CE5 | 873 | 6.6 | 3.36 |
| CE8 | 863 | 0.48 | 25.32 |

As can be seen from the above, all inventive examples fulfil equation (I) as described above.

Table 2 shows the PWPM (peak width at 10% of peak maximum) results for the inventive and comparative examples as indicated. The table shows not only the experimentally measured PWPM values but also the calculated PWPM values according to equation (II).

TABLE 2

| | Density, kg/m$^3$ | MFR2, g/10 min | PWPM (measured) | PWPM (calculated) |
|---|---|---|---|---|
| CE6 | 908.0 | 1 | 1.88 | 1.81 |
| CE7 | 903 | 1.2 | 2.04 | 1.81 |
| CE11 | 902 | 1.1 | 2.01 | 1.81 |
| CE2 | 902 | 10. | 3 | 2.29 |
| CE1 | 902 | 30 | 2.84 | 2.53 |
| IE6 | 901 | 0.91 | 1.69 | 1.79 |
| IE7 | 899.7 | 10.19 | 2.25 | 2.35 |
| IE1 | 901.7 | 31.2 | 2.53 | 2.54 |
| IE8 | 900.6 | 1.03 | 1.78 | 1.82 |
| IE9 | 860.3 | 0.87 | 2.53 | 2.59 |
| IE10 | 857.7 | 2 | 2.65 | 2.83 |
| CE8 | 863 | 0.5 | 2.50 | 2.42 |
| CE9 | 857 | 1 | 3.01 | 2.69 |
| CE10 | 870 | 2.1 | 3.06 | 2.59 |

As can be seen from Table 2 above, the inventive examples have a more narrow CCD (chemical composition distribution) compared to commercially available ethylene copolymers at comparable density and MFR.

Table 3 shows the calculated results for Area A, delta Tp(0.75) and MoCHI of inventive examples and comparative examples from the CFC analysis as described herein.

TABLE 3 calculated results for Area A, delta Tp(0.75) and MoCHI

| | Area A | Delta Tp(0.75) | Mw | MoCHI |
|---|---|---|---|---|
| IE3 | 47.8 | 6.7 | 53000 | 15.2 |
| IE2 | 47.7 | 7.2 | 52000 | 16.1 |
| IE1 | 41.2 | 8.0 | 40419 | 15.1 |

TABLE 3-continued

| calculated results for Area A, delta Tp(0.75) and MoCHI | | | | |
|---|---|---|---|---|
| | Area A | Delta Tp(0.75) | Mw | MoCHI |
| CE11 | 41.8 | 5.4 | 85000 | 11.1 |
| CE7 | 30.0 | 6.6 | 89381 | 9.8 |
| CE12 | 25.5 | 7.3 | 89000 | 9.2 |
| CE13 | 46.1 | 3.6 | 104000 | 8.3 |

Table 3 shows that the inventive examples have a higher MoCHI factor compared to the commercially available comparative examples.

From the inventive and comparative examples given in Table 4 below, films were prepared. Density and MFR2 in Table 4 refer to the copolymer used. Gloss and haze of the obtained films were measured, results are given in Table 4 below.

TABLE 4

| Gloss and Haze of films | | | | |
|---|---|---|---|---|
| | Density, $kg/m^3$ | MFR2, g/10 min | Haze, % | Gloss 20° |
| IE8 | 900.6 | 1.03 | 2.2 | 83.5 |
| IE11 | 900.6 | 9.21 | 4.41 | 104.5 |
| CE14 | 910 | 1.1 | 2.97 | 84.4 |
| IE12 | 908.6 | 1.06 | 3.4 | 65.6 |
| CE15 | 910 | 6.6 | 7.08 | 78.1 |
| IE13 | 908.2 | 6.25 | 6.92 | 86.8 |

Figure 4:
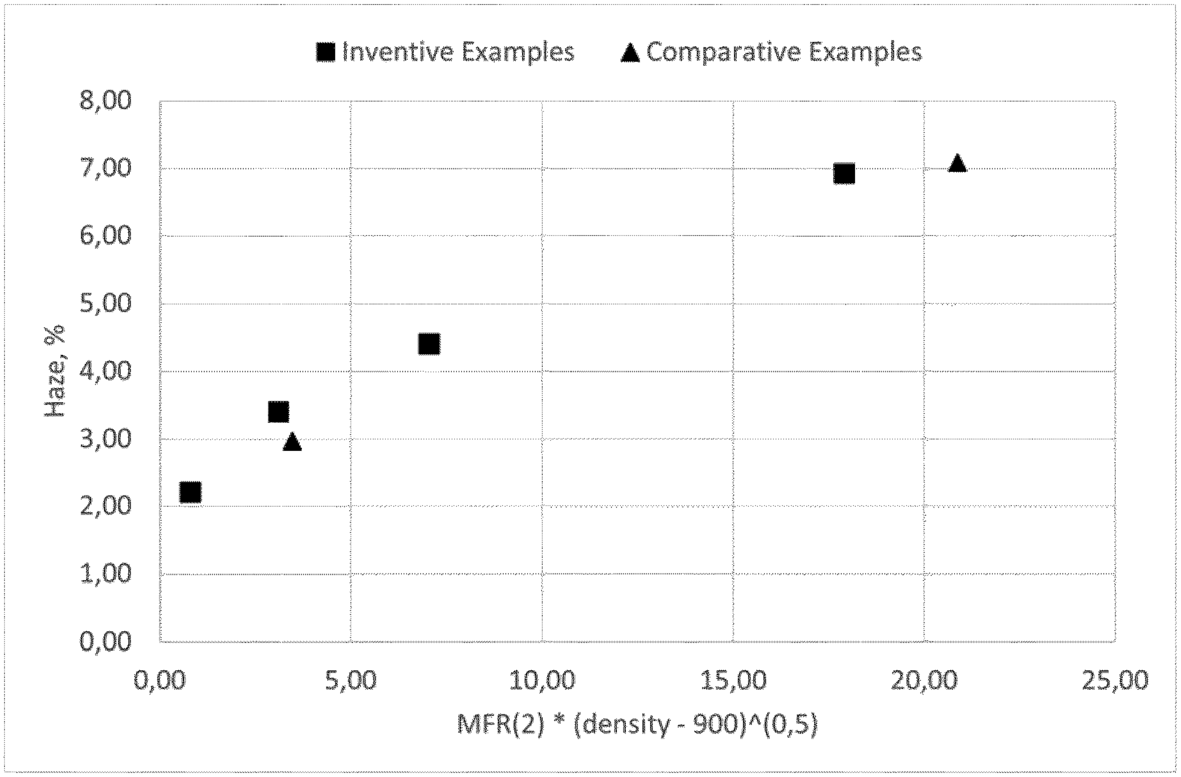

Results for haze are shown in FIG. 4 below, with haze as a function of the normalized parameter $MFR2\times\sqrt{(density-900)}$.

Figure 5:
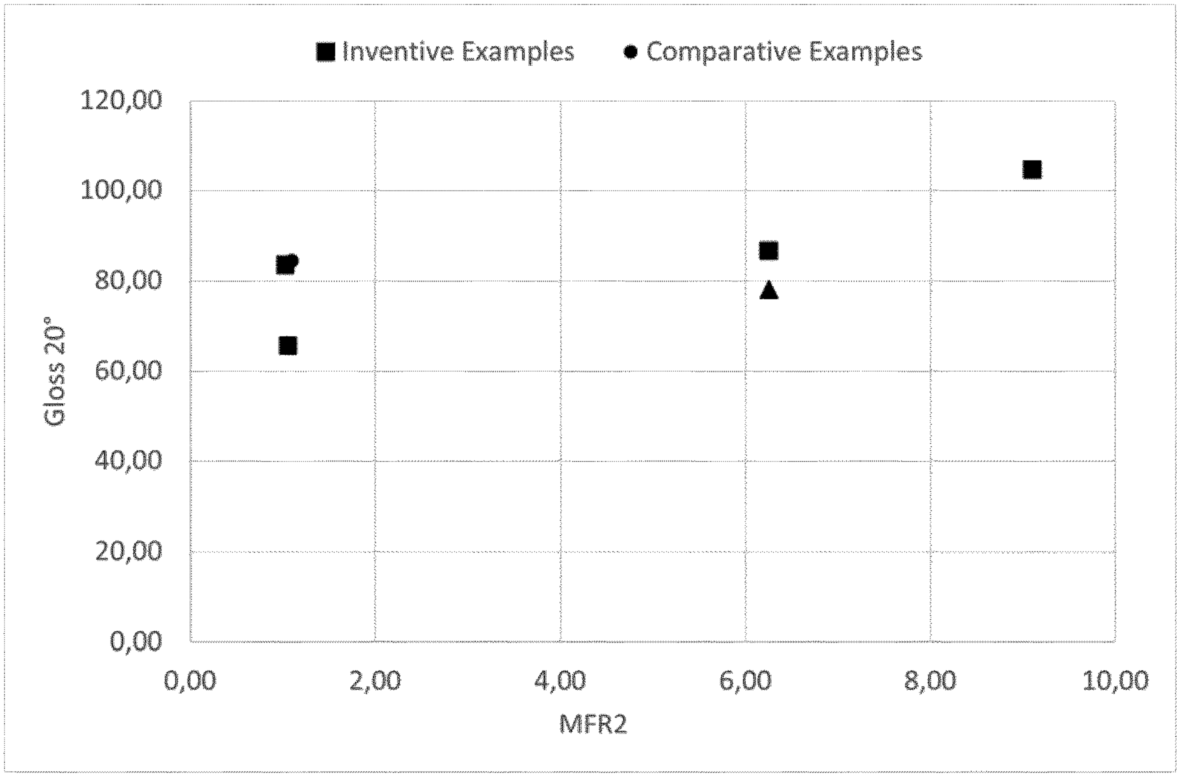

The results for Gloss 20° are shown in FIG. 5 below, with Gloss 20° as a function of MFR2.

The invention claimed is:

1. Copolymer of ethylene and an C3 to C10 alpha-olefin, wherein the copolymer has a density of 850 to 920 $kg/m^3$ measured according to ISO 1183, characterized by a Full Width at Half maximum (FWHM) of the crystallization peak measured according to ISO 11357-3 following the equation (I):

$$FWHM\ (°\ C.)<-0.002104167\cdot d^2+3.749833\cdot d-1666.36 \quad (I)$$

wherein d is the density of the copolymer in $kg/m^3$, characterized in that the copolymer has a MFR2 of 0.1 to 45 g/10 min, measured according to ISO 1133 at a temperature of 190° C. and a load of 2.16 kg.

2. The copolymer according to claim 1, wherein the alpha-olefin is present in the copolymer in an amount of 10 to 47 wt. % based on the total weight of the copolymer.

3. The copolymer according to claim 1, wherein the copolymer has a chemical composition distribution (CCD), determined as described in the experimental part, characterized by a Peak width at 10% of Peak maximum (PWPM) following the equation (II):

$$PWPM<0.22\cdot\ln(MFR_2)+19.83-0.02\cdot d \quad (II)$$

wherein d is the density of the copolymer in $kg/m^3$.

4. The copolymer according to claim 1, wherein the copolymer has a density of 855 to 910 $kg/m^3$ measured according to ISO 1183.

5. The copolymer according to claim 1, wherein the copolymer has a Molecular weight Adjusted Chemical Heterogeneity Index (MoCHI), determined as described in the experimental part, of 11.5 to 18.

6. The copolymer according to claim 5, wherein the copolymer has a density of 890 to 920 $kg/m^3$, measured according to ISO 1183.

7. The copolymer according to claim 1, wherein the alpha-olefin is octene.

8. The copolymer according to claim 1, wherein the copolymer has a MFR21 of 20 to 950 g/10 min, measured according to ISO 1133.

9. The copolymer according to claim 1, wherein the copolymer has a ratio MFR21/MFR2 of 15 to 42.

10. The copolymer according to claim 1, wherein the copolymer has an Mw/Mn determined by Gel Permeation Chromatography (GPC) according to ASTM D 6474-12 of 2.1 to 3.1.

11. The copolymer according to claim 1, wherein the copolymer has an Mw determined by Gel Permeation Chromatography (GPC) according to ASTM D 6474-12 of 30000 to 110000.

12. Article comprising the copolymer according to claim 1.

13. The article according to claim 12, wherein the article is a film.

14. A method for improving the gloss and/or the haze of a film, comprising forming the film from the copolymer according to claim 1.

* * * * *